(12) United States Patent
Starke et al.

(10) Patent No.: US 11,816,772 B2
(45) Date of Patent: Nov. 14, 2023

(54) SYSTEM FOR CUSTOMIZING IN-GAME CHARACTER ANIMATIONS BY PLAYERS

(71) Applicant: Electronic Arts Inc., Redwood City, CA (US)

(72) Inventors: Wolfram Sebastian Starke, Edinburgh (GB); Harold Henry Chaput, Castro Valley, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 44 days.

(21) Appl. No.: 17/644,000

(22) Filed: Dec. 13, 2021

(65) Prior Publication Data

US 2023/0186541 A1    Jun. 15, 2023

(51) Int. Cl.
*A63F 13/57*    (2014.01)
*A63F 13/63*    (2014.01)
*G06T 13/20*    (2011.01)
*G06T 7/20*    (2017.01)

(52) U.S. Cl.
CPC .............. *G06T 13/20* (2013.01); *A63F 13/57* (2014.09); *A63F 13/63* (2014.09); *G06T 7/20* (2013.01); *G06T 2213/12* (2013.01)

(58) Field of Classification Search
CPC ........ A63F 13/56; A63F 13/42; A63F 13/387; A63F 13/57; A63F 13/58; A63F 13/80; A63F 13/40; G06T 13/20; G06T 7/20; G06T 2213/12
See application file for complete search history.

(56) References Cited

U.S. PATENT DOCUMENTS

| | | | |
|---|---|---|---|
| 2002/0013172 A1* | 1/2002 | Kaku ..................... | A63F 13/833 463/32 |
| 2002/0140696 A1* | 10/2002 | Futamura ............ | A63F 13/5258 345/672 |
| 2004/0104912 A1* | 6/2004 | Yamamoto .............. | G06T 17/00 345/473 |
| 2004/0138959 A1* | 7/2004 | Hlavac ............... | G06Q 30/0209 706/46 |
| 2006/0250526 A1* | 11/2006 | Wang ........................ | G06T 7/20 348/663 |
| 2009/0315839 A1* | 12/2009 | Wilson .................. | G06F 3/0488 345/173 |
| 2010/0267465 A1* | 10/2010 | Ceminchuk ........... | A63F 13/655 473/340 |
| 2010/0302257 A1* | 12/2010 | Perez ..................... | G06T 13/80 345/474 |

(Continued)

*Primary Examiner* — David L Lewis
*Assistant Examiner* — Matthew D Hoel
(74) *Attorney, Agent, or Firm* — Knobbe, Martens, Olson & Bear, LLP

(57) ABSTRACT

System and methods for using a deep learning framework to customize animation of an in-game character of a video game. The system can be preconfigured with animation rule sets corresponding to various animations. Each animation can be comprised of a series of distinct poses that collectively form the particular animation. The system can provide an animation-editing interface that enables a user of the video game to make modifications to at least one pose or frame of the animation. The system can realistically extrapolate these modifications across some or all portions of the animation. In addition or alternatively, the system can realistically extrapolate the modifications across other types of animations.

20 Claims, 8 Drawing Sheets

(56) References Cited

U.S. PATENT DOCUMENTS

| | | | |
|---|---|---|---|
| 2011/0221755 A1* | 9/2011 | Geisner | A63F 13/54 |
| | | | 345/474 |
| 2011/0319164 A1* | 12/2011 | Matsushita | G06T 13/20 |
| | | | 463/32 |
| 2012/0028706 A1* | 2/2012 | Raitt | A63F 13/52 |
| | | | 463/31 |
| 2012/0310610 A1* | 12/2012 | Ito | G06T 13/20 |
| | | | 703/6 |
| 2013/0293538 A1* | 11/2013 | Mukai | A63F 13/573 |
| | | | 345/419 |
| 2014/0035933 A1* | 2/2014 | Saotome | A63F 13/57 |
| | | | 345/474 |
| 2017/0090577 A1* | 3/2017 | Rihn | G06F 3/016 |
| 2017/0161909 A1* | 6/2017 | Hamanaka | A63F 13/25 |
| 2018/0338136 A1* | 11/2018 | Akaike | G06T 15/10 |
| 2019/0122152 A1* | 4/2019 | McCoy | G06Q 10/06313 |
| 2019/0206181 A1* | 7/2019 | Sugai | G06T 13/20 |
| 2020/0020166 A1* | 1/2020 | Menard | G06V 10/82 |
| 2020/0078683 A1* | 3/2020 | Anabuki | A63F 13/42 |
| 2021/0042526 A1* | 2/2021 | Ikeda | A63F 7/0632 |
| 2021/0316221 A1* | 10/2021 | Waszak | A63F 13/57 |
| 2022/0383578 A1* | 12/2022 | Kennewick, Sr. | A63F 13/428 |
| 2023/0186541 A1* | 6/2023 | Starke | G06T 13/20 |
| | | | 463/31 |

* cited by examiner

SYSTEM FOR CUSTOMIZING IN-GAME CHARACTER ANIMATIONS BY PLAYERS

TECHNICAL FIELD

The present disclosure relates to systems and techniques for animation generation. More specifically, this disclosure relates to machine learning techniques for modifying animation of characters during runtime of a video game.

BACKGROUND

Electronic games are increasingly becoming more realistic due to an increase in available processing resources. This increase in realism may allow for more realistic gameplay experiences. For example, elements that form an in-game world, such as characters, may be more realistically presented. In this example, the elements may be increasingly rendered at higher resolutions, with more detailed textures, with more detailed underlying meshes, and so on. While this added realism may be beneficial to an end-user of an electronic game, it may place a substantial burden on electronic game developers. As an example, electronic game developers may be required to create very rich, and detailed, models of characters. As another example, electronic game designers may be required to create fluid, lifelike, movements of the characters.

With respect to the example of movement, characters may be designed to realistically adjust their arms, legs, and so on, while traversing an in-game world. In this way, the characters may walk, run, jump, and so on, in a lifelike manner. With respect to a sports electronic game, substantial time may be spent ensuring that the characters appear to mimic real-world sports players. For example, electronic game designers may spend substantial time fine-tuning movements of an underlying character model. Movement of a character model may be, at least in part, implemented based on movement of an underlying skeleton. For example, a skeleton may include a multitude of objects (e.g., bones and joints) which may represent a portion of the character model. As an example, a first object may be a finger while a second object may correspond to a wrist. The skeleton may therefore represent an underlying form on which the character model is built. In this way, movement of the skeleton may cause a corresponding adjustment of the character model.

To create realistic movement, an electronic game designer may therefore adjust positions of the above-described objects included in the skeleton. For example, the electronic game designer may create realistic running via adjustment of specific objects which form a character model's legs. This hand-tuned technique to enable movement of a character results in substantial complexity and usage of time.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

Certain aspects of the present disclosure relate to a computer-implemented method for customizing animation of an in-game character of a video game. The method may be implemented by one or more processors configured with specific computer-executable instructions. The method may include executing a game application on a client computing device. The game application can include game data. The game data can include an animation rule set including a series of character poses defining animation of a first action of an in-game character within the game application. An in-game character can include a plurality of rigid bodies connected by a plurality of joints. Each character pose of the series of character poses is a particular arrangement of the rigid bodies and joints of the in-game character. The method can further include, during runtime of the game application, identifying one or more character poses associated with animation of the first action; and receiving, from a user of the game application, a modification to a first character pose of the one or more character poses. The modification can include a change to at least one position, angle, or velocity associated with the arrangement of the rigid bodies and joints of the in-game character. The method can further include generating one or more modified character poses for the first action based at least in part on the modification to the first character pose. The one or more modified character poses for the first action can be generated using a motion generation machine learning model. The method can further include updating the animation rule set to generate a modified animation rule set for the first action. The one or more modified character poses for the first action can replace the corresponding one or more unmodified character poses for the first action. The modified animation rule set can define the modified series of character poses generated by the character within a virtual environment of the game application when performing the first action.

The method of the preceding paragraph may also include any combination of the following features or steps described in this paragraph, among other features or steps described herein. The animation rule set can be a first animation rule set. The series of character poses can be a first series of character poses. The game data further can include a second animation rule set including a second series of character poses defining animation of a second action. The method can further include generating one or more modified character poses for the second action based at least in part on the modification to the first character pose. The one or more modified character poses for the second action can be generated using a motion generation machine learning model. The method can further include updating a second animation rule set to generate a modified second animation rule set for the second action. The one or more modified character poses for the second action can replace corresponding one or more unmodified character poses for the second action.

The method of any of the preceding paragraphs may also include any combination of the following features or steps described in this paragraph, among other features or steps described herein. The first action can be a first type of animation and the second action can be a second type of animation that can be different from the first type of animation. The first type of animation can be one of a locomotion or an asynchronous motion, and the second type of animation can be the other one of the locomotion or the asynchronous motion. The locomotion can include at least one of running, jumping, hopping, crawling, marching, climbing, galloping, sliding, leaping, hopping, or skipping. The asynchronous animation can include at least one of standing up, sitting down, punching, kicking, swing a sword, or bending. The first type of animation can be one of a first type of locomotion, and the second type of animation can be a second type of locomotion.

The method of any of the preceding paragraphs may also include any combination of the following features or steps described in this paragraph, among other features or steps described herein. The method can further include post-processing the one or more modified character poses for the first action to resolve motion artifacts of the one or more modified character poses for the first action associated with the modification. Identifying the one or more character poses associated with animation of the first action can include receiving a selection from a user of the game application. The selection can indicate the one or more character poses associated with animation of the first action. The method can further include monitoring gameplay of the game application during the runtime of the game application. The method can further include identifying, during the monitoring, an occurrence of a first triggering game state during the runtime of the game application. The identifying can be based on defined game conditions within the game application. The method can further include, responsive to said identifying the occurrence of the first triggering game state, applying the modified animation rule set during the runtime of the game application causing the in-game character to perform the first action.

The method of any of the preceding paragraphs may also include any combination of the following features or steps described in this paragraph, among other features or steps described herein. The method can further include providing an animation editor interface that provides an interface for the user to select the modification to the to the first character pose of the one or more character poses. The animation editor interface can display a plurality of possible modifications. The modification can include a set of the plurality of possible modifications.

Some embodiments of the present disclosure provide a non-transitory computer-readable storage medium storing computer-executable instructions that, when executed by one or more computing devices, configure the one or more computing devices to perform operations associated with a method. The method can include the method of any steps or features of the preceding paragraphs, among other steps or features described herein.

Some embodiments of the present disclosure provide a system for customizing animation of an in-game character of a video game. The system can include one or more processors configured with computer-readable instructions. The one or more processors can be configured to execute a game application on a client computing device. The game application can include game data. The game data can include an animation rule set including a series of character poses defining animation of a first action of an in-game character within the game application. The in-game character can include a plurality of rigid bodies connected by a plurality of joints. Each character pose of the series of character poses can be a particular arrangement of the rigid bodies and joints of the in-game character. The one or more processors can be configured to, during runtime of the game application, identify one or more character poses associated with animation of the first action. The one or more processors can be configured to receive, from a user of the game application, a modification to a first character pose of the one or more character poses. The modification can include a change to at least one position, angle, or velocity associated with the arrangement of the rigid bodies and joints of the in-game character. The one or more processors can be configured to generate one or more modified character poses for the first action based at least in part on the modification to the first character pose. The one or more modified character poses for the first action can be generated using a motion generation machine learning model. The one or more processors can be configured to update the animation rule set to generate a modified animation rule set for the first action. The one or more modified character poses for the first action replace the corresponding one or more unmodified character poses for the first action. The modified animation rule set can define the modified series of character poses generated by the character within a virtual environment of the game application when performing the first action.

The system of any of the preceding paragraphs may also include any combination of the following features or steps described in this paragraph, among other features or steps described herein. The system can include any steps or features of the preceding paragraphs, among other steps or features described herein.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Figure 1:
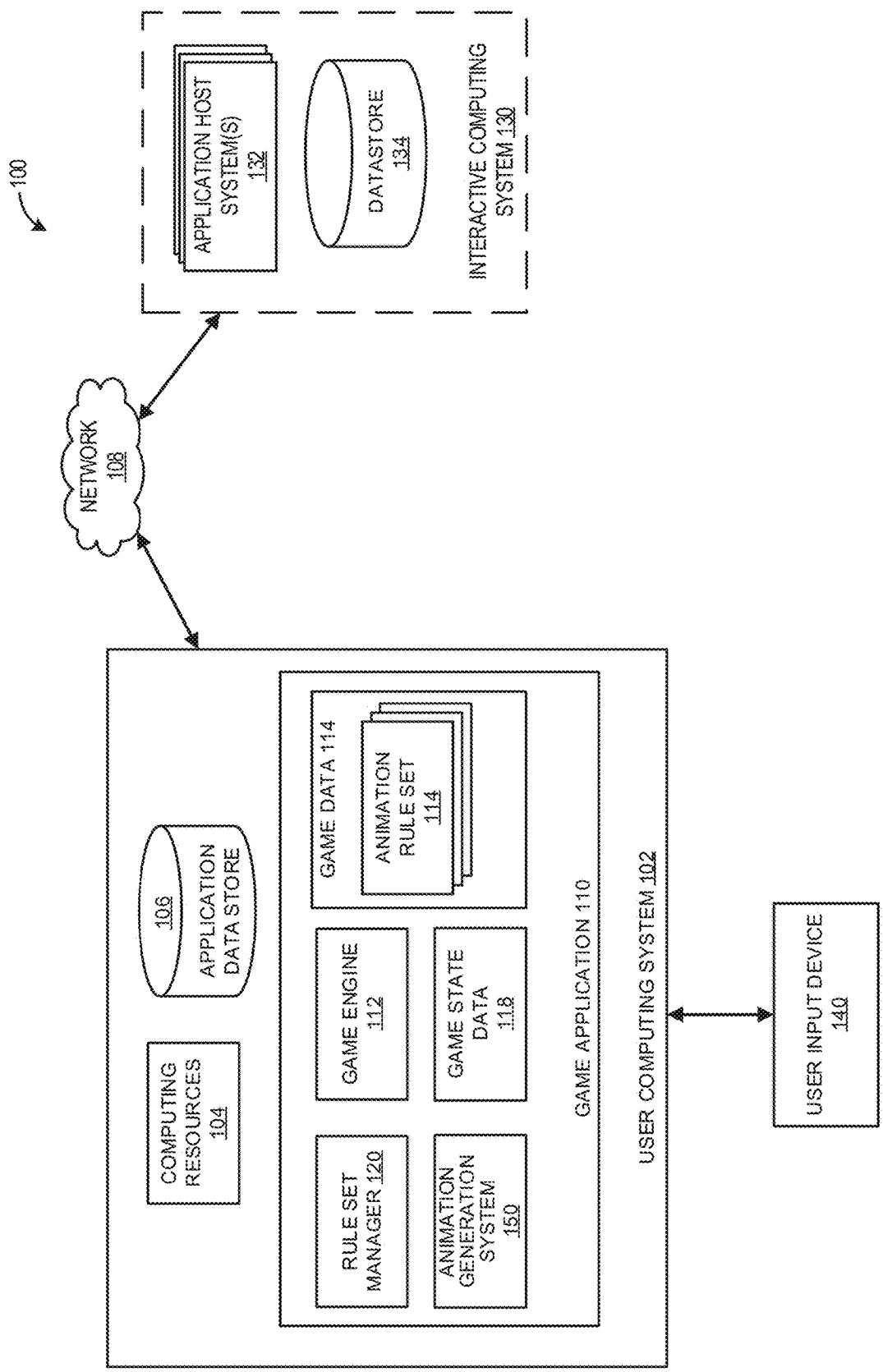
FIG. 1 illustrates an embodiment of a computing environment for customizing animation of an in-game character during runtime of a video game.

This specification describes, among other things, technical improvements with respect to modifying animation of characters during runtime of a video game 110. As will be described, a system (e.g., the animation generation system 150) may implement a motion generation machine learning model (e.g., a pose generation engine 220) to create a realistic interpolation of an in-game character's full-body pose, according to changes in the pose (and/or other changes) introduced by the player of the video game 110. Advantageously, the system may perform a substantially automated analyses of pose and/or motion modifications such that users can create novel or unseen motion sequences, combinations, or variations thereof in a controllable manner. The animation generation system can overcome the issues of traditional blending and layering techniques common in games, which suffer from artifacts that violate physics and often break the character pose in unnatural configurations. Furthermore, the system advantageously allows intuitive in-game modifications to poses and/or character motions, and without requiring animators to perform the modification.

Motion may be defined, at least in part, based on a series of distinct poses of an in-game character. As an example, each pose may represent a discrete sample of the motion to be performed by the in-game character. For this example, the pose may identify positions, including rotations, of rigid bodies (e.g., bones) or joints of the in-game character. Thus, if motion is to depict running, each pose may represent a snapshot of the running. For example, a first frame generated by an electronic game may include the in-game character with both feet on a surface within the game world. As another example, a second frame may include the in-game character beginning to move one of the feet upwards. It may be appreciated that subsequent frames may include the in-game character moving forward in a running motion.

Typically, the above-described in-game character may be animated to produce this running motion. For example, an electronic game designer may generate different frames which depict poses used for the running motion. In this example, the electronic game designer may create frames which depict the in-game character with its feet on a surface, with one leg partially raised upwards, and so on. During gameplay, the electronic game may interpolate between these frames such that the in-game character appears to transition between them. As another example, clips of animation may be generated by the electronic game designer for specific motions. In this example, one or more clips of animation may be generated to represent the running motion. These clips may then be played by the electronic game to produce animation.

To generate motions for in-game characters, electronic game designers are increasingly leveraging motion capture data. For example, motion capture data may be used to learn the realistic gait of an individual as they move about a motion capture studio. Specific portions of the individual, such as joints or bones, may be monitored during this movement. Subsequently, movement of these portions may be extracted from image or video data of the individual, and/or from inertia-based sensors, such as accelerometers or gyroscopic sensors. This movement may then be translated onto a skeleton or rig for use as an underlying framework of one or more in-game characters. The skeleton or rig may include bones, which may be adjusted based on the motion capture images or video. In this way, the skeleton or rig may be animated to reproduce motion performed by the individual.

While motion capture data allows for realistic motion, it can be a time-consuming process and is limited in the types of motion able to be reproduced. For example, the above-described skeleton may be animated to reproduce motions which were specifically performed by the individual. Any variations to the motions must be reproduced during motion capture or manually created by an electronic game designer. For example, and with respect to a sports electronic game, a real-life sprinter may be used as an individual to perform one or more running motions. However, while this individual may perform a wide breadth of gait variations, it will be appreciated that other gait variations will not be recorded. For example, as various combinations of modifications to gait parameters, such as stride length, head placement, arm flex angle, knee bend angle, arm swing, etc., may not be recorded or even contemplated by the individual.

In some embodiments, the animation generation system addresses such issues using a deep learning framework implementing a motion generation machine learning model to create a realistic extrapolation of an in-game character's full-body pose, according to changes in the pose introduced by the player of the video game. The system can be preconfigured with animation rule sets corresponding to various animations, such as animations for a standard walking motion, a standard running motion, a standard kicking motion, or the like. Each animation can be comprised of a series of distinct poses that collectively form the particular animation. The system can provide an animation-editing interface that enables a user of the video game to make edits to at least one pose (or frame) of the animation. For example, the edits can include changes to positions, angles, or velocities of body parts. The animation generation system can use a deep learning framework to realistically extrapolate these edits into edits across portions (or the entire) animation. In this way, users of the video game can easily create and apply unique modifications to animations, to create customized animations that realistically (e.g., avoiding transitions or movements that violate physics or place the in-game characters in an unnatural configurations) integrate the user's edits. To that end, the systems and methods described herein enable a player of the video game to easily customize animations of an in-game character with unique modifications to available animations. As examples, the unique modifications can result in a lower-crouch or sideways-leaning zombie-walk, a different angle of swinging a sword at a certain height, more energetic or lazy dancing moves, etc.

Furthermore, the animation generation system can use a deep learning framework to realistically extrapolate edits of one type of animation (e.g., walking) into edits for one, some, or all other types of animation (e.g., running, jumping, hopping, crawling, marching, climbing, galloping, sliding, leaping, hopping, skipping, standing up, sitting down, punching, kicking, swing a sword, bending, etc.). Consider an example in which the user of the video game uses the animation-editing interface to modify at least one pose of the walking animation to cause the in-game character to lean sideways (e.g., similar to a zombie-walk). In such a scenario, as described above, the animation generation system can use a deep learning framework to realistically extrapolate the sideways lean into edits across walking animation, such that the modified walking animation depicts the in-game character walking with the sideways lean. Furthermore, the animation generation system can use a deep learning framework to realistically extrapolate the sideways lean into edits across other types of animation, such as the running animation, such that the modified running motion depicts the in-game character to run with a sideways lean. Similar deep learning framework can be utilized to modify some or all of the types of animation associated with that in-game character and/or the user profile of the user of the video game. In this way, the animation generation system can enable the user of the video game 110 to make global (or semi-global) modifications to some or all of the types of animation performed by the in-game character, all while actively editing only one or a few types of animation.

In some embodiments, the animation generation system uses a deep learning framework capable of interpolating modifications to a pose or motion of an in-game character into novel and unseen sequences, combinations or variations thereof in a controllable manner. The animation generation system can overcome the issues of traditional blending and layering techniques common in games, which suffer from artifacts that violate physics and often break the character pose in unnatural configurations, and without requiring changes to be performed by professional animators or game creators. The animation generation system can interpolate a large variety of modifications to character movements and actions, including variations or modifications to running, jumping, punching, kicking, attacking, and other character actions in high quality while avoiding intensive manual labor when working with unstructured large-scale datasets. In some embodiments, motion can be generated for biped and/or human characters. In some embodiments, motion can be generated for characters having different anatomies, such as quadruped characters.

In some embodiments, the animation generation system alleviates and mitigates the issues above by applying a neural network to modify motion for type of animation (e.g., running) based on a modification to a single or a few poses or frames. For example, a user can input an instruction to introduce an arch the character's back posture. In such as example, the animation generation system can apply a neural network to modify some or the entire running motion (e.g., a series of distinct poses), such that the modified running motion includes the back posture modification, is performed realistically, and is automatically generated by the animation generation system. Furthermore, the resultant animation of the running motion can position the limbs of the characters in realistic positions where the upper body and the lower body are connected, and the feet are not sliding in motion. The animation generation system performs layering inside the trajectory space and feeds the layered output to a neural network instead of providing the neural network with pose information directly.

Overview of Video Game Environment

FIG. 1 illustrates an embodiment of a computing environment 100 for customizing animation of an in-game character during runtime of a video game 110. The environment 100 includes a network 108, a user computing system 102, and an interactive computing system 130. To simplify discussion and not to limit the present disclosure, FIG. 1 illustrates only one user computing system 102 and only one interactive computing system 130, though multiple may be used. For example, the computing environment 100 may have tens, hundreds, thousands, tens of thousands, hundreds of thousands, or millions of user computing systems 102, with each user computing system 102 enabling one or more users to interact with the game application 110. Further, one or more of the user computing systems 102 may be configured differently from computing environment 100. For simplicity, the user computing system 102 may be described in the singular or the plural. However, it should be understood that any description of the user computing system 102 or user computing systems 102 may apply to one or more of the user computing systems 102 and may or may not apply to each of the user computing systems 102.

The user computing system 102 may communicate via a network 108 with the interactive computing system 130. Although only one network 108 is illustrated, multiple distinct or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

User Computing Systems

FIG. 1 illustrates an example user computing system 102. The user computing system 102 may include hardware and software components for establishing communications over a communication network 108. For example, the user computing system 102 may be equipped with networking equipment and network software applications (e.g., a web browser) that facilitate communications via one or more networks 108 (e.g., the Internet or an intranet). The user computing system 102 may have varied local computing resources such as central processing units (CPU) and architectures, memory, mass storage, graphics processing units (GPU), communication network availability and bandwidth, and so forth. Further, the user computing system 102 may include any type of computing system. For example, the user computing system 102 may include any type of computing device(s), such as desktops, laptops, video game 110 platforms, television set-top boxes, televisions (e.g., Internet TVs), network-enabled kiosks, car-console devices computerized appliances, wearable devices (e.g., smart watches and glasses with computing functionality), or wireless mobile devices (e.g., smart phones, PDAs, tablets, or the like), to name a few. The specific hardware and software components of the user computing systems 102 are referred to generally as computing resources 104. The user computing system 102 can be configured to receive input from a user input device 140.

Game Application

The user computing system 102 can include a game application 110 installed thereon. The user computing system 102 can execute a game application 110 based on software code stored at least in part in the application data store 106. The game application 110 may also be referred to herein as a video game 110, a game, game code or a game program. A game application 110 should be understood to include software code that a computing device can use to provide a game for a user to play. A game application 110 may include software code that informs a computing device 102 of processor instructions to execute, but may also include data used in the playing of the game, such as data relating to game simulation, rendering, animation, and other game data. In the illustrated embodiment, the game application 110 includes a game engine 112, game data 114, and game state data 118. When executed, the game application 110 is configured to generate a virtual environment for a user to interface with the game application 110.

In some embodiments, the user computing system 102 can execute machine readable instructions that are configured to execute the game application 110. The game application 110 may be stored or executed in a distributed environment using a client/server architecture. For example, the user computing system 102 may execute a portion of a game application 110 and the interactive computing system 130, or an application host system 132 of the interactive computing system 130 may execute another portion of the game application 110. For instance, the game application 110 may be a massively multiplayer online role-playing game (MMORPG) that includes a client portion executed by the user computing system 102 and a server portion executed by one or more application host systems 132. For the present discussion, the game application 110 can execute locally on the user computing system 102 or can execute as a distributed application that includes a portion that executes on the user computing system 102 and a portion that executes on at least one of the application host systems 132.

Game Engine

During operation, the game engine 112 executes the game logic, controls execution of the simulation of gameplay, and controls rendering within the game application 110. In some cases, the game engine 112 controls characters, the environment, execution of the gameplay, how the game progresses, or other aspects of gameplay based on one or more stored animation rule sets 114. For example, the game engine 112 can monitor gameplay and detect or determine a current runtime state of the game application 110. Based at least in part on the current runtime state of the game application, the game engine 112 applies an animation rule set 114 to control the characters or the environment. For example, as described herein, an animation rule set 114 can define actions or motions to be performed by one or more in-game characters.

In some embodiments, the game engine 112 can include a simulation engine and a presentation engine. The simulation engine executes the game logic and controls execution of the gameplay simulation. The presentation engine controls execution of presentation of the gameplay and rendering of frames. In some embodiments, the game engine 112 can execute the functionality of the simulation engine and the presentation engine using different engines and/or processes within the game application.

The simulation engine can control execution of individual virtual components, virtual effects, or virtual objects within the game application 110. The simulation engine can manage and determine character movement, character states, collision detection, derive desired motions for characters based on collisions, or the like. The simulation engine receives user inputs and determines character events, such as actions, collisions, runs, throws, attacks and other events appropriate for the game. The character events can be controlled by character movement streams that determine the appropriate motions the characters should make in response to events. The simulation engine can interface with a physics engine that can determine new poses for the characters. The physics engine can have as its inputs, the skeleton models of various characters, environmental settings, character states such as current poses (e.g., positions of body parts expressed as positions, joint angles or other specifications), and velocities (linear or angular) of body parts and motions provided by a character movement module, which can be in the form of a set of force/torque vectors for some or all body parts. From this information, the physics engine generates new poses for the characters using rules of physics and those new poses can be used to update character states. The game device provides for user input to control aspects of the game according to animation rule sets 114.

The simulation engine can output graphical state data (e.g., game state data 114) that is used by presentation engine to generate and render frames within the game application 110. In some embodiments, each virtual object can be configured as a state stream process that is handled by the simulation engine. Each state stream process can generate graphical state data for the presentation engine. For example, the state stream processes can include emitters, lights, models, occluders, terrain, visual environments, and other virtual objects with the game application 110 that affect the state of the game.

The presentation engine can use the graphical state data to generate and render frames for output to a display within the game application 110. The presentation engine can combine the virtual objects, such as in-game characters, animate objects, inanimate objects, background objects, lighting, reflection, and the like, in order to generate a full scene and a new frame for display. The presentation engine can take into account the surfaces, colors textures, and other parameters of the virtual objects. The presentation engine can then combine the virtual objects (e.g., lighting within the virtual environment and in-game character images with inanimate and background objects) to generate and render a frame.

Game Data

The game data 114 can include animation rule sets 114, prerecorded motion capture poses/paths, environmental settings, environmental objects, constraints, skeleton models, route information, or other game application information.

Animation rule sets 114 can be applied by the game engine 112 to control characters, the environment, execution of the gameplay, how the game progresses, or other aspects of gameplay. The animation rule sets 114 can define the specific way in which players (e.g., player characters or non-player characters) or the environment behaves or interacts within the video game 110. In some cases, the animation rule sets 114 can correspond to various types of animation, such as repetitive motions (e.g., locomotion) and/or non-repetitive motions (e.g., asynchronous motion). For example, the game data 114 may include a different animation rule sets 114 for some or all locomotion activities (such as, but not limited to, walking, running, jumping, hopping, crawling, marching, climbing, galloping, sliding, leaping, hopping, or skipping) and/or some or all asynchronous activities (such as, but not limited to, standing up, sitting down, punching, kicking, swing a sword, or bending).

In some cases, an animation rule set 114 can define a particular type of animation (e.g., running) as a series of distinct poses of an in-game character. As an example, each pose may represent a discrete sample of the motion to be performed by the in-game character. An in-game character can comprise a plurality of rigid bodies (e.g., bones) connected by a plurality of joints. In some such cases, a particular pose may define a particular arrangement (e.g., positions, rotations, etc.) of the rigid bodies and/or joints of the in-game character. Thus, an animation rule set 114 for running may include a series of distinct poses, where each pose may represent a snapshot of the running. For example, a first frame generated according to an animation rule set 114 for running may include the in-game character with both feet on a surface within the game world, a second frame may include the in-game character beginning to move one of the feet upwards, and subsequent frames may include the in-game character moving forward in a running motion.

In some cases, the game data 114 can include multiple animation rule sets 114 for the same type of animation. For instance, continuing with the example above, the game data 114 can include a first animation rule set 114 for a first version of running and a second animation rule set 114 for a second version of running. In some such cases, the first and second animation rule sets 114 may each correspond to "running," but may include one or more different poses. For example, the first animation rule set 114 may correspond to an in-game character that has a generally upright posture, while the second animation rule set 114 may correspond to an in-game character that has a slightly hunched back and/or shoulders. By providing multiple animation rule sets 114 for the same type of animation, a user of the game application may choose one or more of the multiple animation rule sets 114 to assign to an in-game character mode.

Animation rule sets 114 may include character control variables. These variables may inform the in-game character's motion. For example, the character control variables may include trajectory information for the in-game character. In this example, the trajectory information may indicate positions of the in-game character (e.g., a current position and or one or more prior positions), velocity of the in-game character (current velocity and or one or more prior velocities), and so on. In some embodiments, the character control variables and user input may be separately weighted and combined.

The game application 110 may provide an animation editing system (e.g., an animation-editing interface) that allows the user to make one or more modifications to animation rule sets 114. For example, as mentioned, an animation rule set 114 can include or define a series of poses that collectively form an animation. In some cases, the animation editing system allows the user to make one or more modifications to at least one pose of the series of poses, thereby modifying the associated animation rule set 114. As described herein, in some cases, the animation editing system may extrapolate edits or modifications of one animation rule set 114 (such as one frame or pose in the animation rule set) into some or all of the other animation rules sets associated with a character.

Consider a scenario in which a first animation rule set 114 corresponds to a first type of animation (e.g., walking) and a second animation rule set 114 corresponds to a second type of animation (e.g., running). Further, consider that the first animation rule set 114 defines a series of first poses relating to walking, and the second animation rule set 114 defines a series of second poses relating to running. In such a scenario, in some cases, a user of the video game 110 can provide input to modify one or more pose of the series of first poses relating to walking. For example, the modification may introduce a sideways lean into the pose. In some cases, based on the modification to a signal pose, the animation editing system can make corresponding modifications to the other poses of the series of first poses relating to walking. In this way, an updated or modified first animation rule set 114 can correspond to walking with a sideways lean. Furthermore, in some cases, the animation editing system can extrapolate the modification to other types of animation. For example, based on the modification to the pose relating to walking, the animation editing system can make similar modifications to the series of second poses relating to running. In this way, an updated or modified second animation rule set 114 can correspond to running with the sideways lean.

At least a portion of the game data 114 can be stored in the application data store 106. In some embodiments, a portion of the game data 114 may be received or stored remotely, such as in the data store 134. Game data may be received during runtime of the game application 110. For example, in some cases, one or more animation rule sets 114 can be applied, modified, created, or stored during runtime of the game application 110.

Game State Data

During runtime of the game application 110, the game application 110 can collect or store game state data 118, which can include a game state, character states, environment states, scene object storage, route information, or information associated with a runtime state of the game application 110. For example, the game state data 118 can identify the state of the game application 110 at a specific point in time, such as a character position, character orientation, character action, game level attributes, and other information contributing to a state of the game application 110. The game state data can include simulation game state data and graphical game state data. The simulation game state data can include game state data that is used by the game engine 112 to execute the simulation of the game application 110. The graphical game state data can include game state data that is generated based on the simulation state data and is used to generate and render frames for output on a display.

Rule Set Manager

The rule set manager 120 can facilitate application of the animation rule sets 114 by the game engine 112. For example, the rule set manager 120 can interface with the game engine 112 to cause the game engine 112 to apply the appropriate animation rule set 114. In some cases, the game data 114 can include multiple animation rule sets 114, and a particular animation rule set 114 can be associated with a particular runtime state of the game application. The rule set manager 120 can monitor gameplay of the game application 110 to determine the current or anticipated runtime state of the game application 110. Based on the current or anticipated runtime state of the game application, the rule set manager 120 can provide the game engine 112 with the appropriate animation rule set 114 to apply.

In some implementations, the rule set manager 120 is an add-in (sometimes referred to as an add-on, extension, or plug-in). For example, the rule set manager 120 can be available for download by the user computing systems 102 and can be installed locally in volatile or non-volatile memory on the user computing systems 102. In some embodiments, a rule set manager 120 may be executed on a remote server. For example, the rule set manager 120 may be executed on the interactive computing system 130. In some instances, the rule set manager 120 that is available to a particular user may be based on the software that has been previously installed by the user on the user computing system 102. For example, some rule set managers 120 may require a license in order to utilize the tools.

Virtual Environment

As used herein, a virtual environment may include a simulated environment (e.g., a virtual space) instanced on a user computing system 102, a server (e.g., the interactive computing system 130) that is accessible by a client (e.g., user computing system 102) located remotely from the server, to format a view of the virtual environment for display to a user of the client. The simulated environment may have a topography, express real-time interaction by the user, or include one or more objects positioned within the topography that are capable of locomotion within the topography. In some implementations, the topography may be a two-dimensional topography. In other instances, the topography may be a three-dimensional topography. In some implementations, the topography may be a single node. The topography may include dimensions of the virtual environment, or surface features of a surface or objects that are "native" to the virtual environment. In some implementations, the topography may describe a surface (e.g., a ground surface) that runs through at least a substantial portion of the virtual environment. In some implementations, the topography may describe a volume with one or more bodies positioned therein (e.g., a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally or rotating based on user interaction).

The game instance of the game application 110 may include a simulated virtual environment, for example, a virtual environment that is accessible by users via clients (e.g., user computing systems 102) that present the views of the virtual environment to a user. The virtual environment may have a topography, express ongoing real-time interaction by one or more users or include one or more objects positioned within the topography that are capable of locomotion within the topography. In some instances, the topography may include a two-dimensional topography. In other instances, the topography may include a three-dimensional topography. The topography may include dimensions of the space or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, or semi-synchronous.

It should be understood the description of the manner in which state of the virtual environment associated with the video game 110 is not intended to be limiting. The game application 110 may be configured to express the virtual environment in a more limited, or richer, manner. For example, views determined for the video game 110 representing the game state of the instance of the video game 110 may be selected from a limited set of graphics depicting an occurrence in a given place within the video game 110. The views may include additional content (e.g., text, audio, pre-stored video content, or other content) that describes particulars of the current state of the place, beyond the relatively generic graphics. For example, a view may include a generic battle graphic with a textual description of the opponents to be confronted. Other expressions of individual places within the video game 110 are contemplated.

The game engine 112 generates game state data 118 that may be used locally within the game application 110 and may be transmitted to the interactive computing system 130 over network 108. The execution of the instance of the game application 110 may include determining a game state associated with the game application 110. The game state data 118 may facilitate presentation of views of the video game 110 to the users on the user computing systems 102. The game state data 118 may include information defining the virtual environment in which the video game 110 is played. The execution of the game engine is described in further detail herein.

The execution of the game instance may enable interaction by the users with the game application 110 or other users through the interactive computing system 130. The game application 110 may be configured to perform operations in the game instance in response to commands received over network 108 from user computing systems 102. In some embodiments, users may interact with elements in the video game 110 or with each other through the video game 110.

Users may participate in the video game 110 through client game applications 110 implemented on user computing systems 102 associated with the users. Within the game instance of the video game 110 executed by the game engine 112, the users may participate by controlling one or more of an element in the virtual environment associated with the video game 110. The user-controlled elements may include avatars, user characters, virtual environment units (e.g., troops), objects (e.g., weapons, horses, vehicle and so on), simulated physical phenomena (e.g., wind, rain, earthquakes, or other phenomena), or other user-controlled elements.

The user-controlled avatars may represent the users in the virtual environment. The user characters may include heroes, knights, commanders, leaders, generals or any other virtual environment entities that may possess strength, skills, abilities, magic powers, knowledge, or any other individualized attributes. The virtual environment units controlled by the user may include troops or any other game entities that may be trained, recruited, captured, or otherwise acquired by the users in groups or en-mass. The objects controlled by the users may include weapons, vehicles, projectiles, magic items, wardrobes, boots, armor, knapsacks, medicine, healing potion, or any other virtual items that may be employed by the users for interaction within the video game 110.

The user-controlled element(s) may move through and interact with the virtual environment (e.g., user-virtual environment units in the virtual environment, non-user characters in the virtual environment, other objects in the virtual environment). The user controlled elements controlled by or associated with a given user may be created or customized by the given user. The user may have an "inventory" of virtual goods or currency that the user can use (e.g., by manipulation of a user character or other user controlled element, or other items) within the virtual environment.

Controls of virtual elements in the video game 110 may be exercised through commands input by a given user through user computing systems 102. The given user may interact with other users through communications exchanged within the virtual environment. Such communications may include one or more of textual chat, instant messages, private messages, voice communications, or other communications. Communications may be received and entered by the users via their respective user computing systems 102. Communications may be routed to and from the appropriate users through server(s) (e.g., through application host system 132).

Execution or performance of the user action by the game engine 112 may produce changes to the game state, which may reflect progresses or results of the user actions. In some examples, state changes caused by the execution of the user actions may be recorded in the application data store 106 or data store 134 to facilitate persistency throughout the instance of the video game 110. In some examples, execution of the user actions may not produce persistent changes to the game state (e.g., a user character jumping forward and backward successively may not produce any perceivable game state changes to other users).

A given user may input commands with specific parameters to undertake specific deeds, actions, functions, spheres of actions or any other types of interactions within the virtual environment. For example, the given user may input commands to construct, upgrade or demolish virtual buildings; harvest or gather virtual resources; heal virtual user-controlled elements, non-player entities or elements controlled by other users; train, march, transport, reinforce, reassign, recruit, or arrange troops; attack, manage, create, demolish or defend cities, realms, kingdoms, or any other virtual environment locations controlled by or associated with the users; craft or transport virtual items; interact with, compete against or along with non-player entities or virtual environment elements controlled by other users in combats; research technologies or skills; mine or prospect for virtual resources; complete missions, quests, or campaigns; exercise magic power or cast spells; or perform any other specific deeds, actions, functions, or sphere of actions within the virtual environment. In some examples, the given user may input commands to compete against elements in an environment within the virtual environment—for example, Player vs. Environment (PvE) activities. In some examples, the given user may input commands to compete against each other within the virtual environment—for example, Player vs. Player (PvP) activities.

The instance of the video game 110 may include virtual entities automatically controlled in the instance of the video game 110. Such virtual entities may or may not be associated with any user. As such, the automatically controlled virtual entities may be generated or developed by artificial intelligence configured with the game application 110 or server(s) interactive computing system 130 by a provider, administrator, moderator, or any other entities related to the video game 110. These automatically controlled entities may evolve within the video game 110 free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server(s) (e.g., application host system 132). As used herein, such automatically controlled virtual environment entities in the instance of the video game 110 are referred to as "non-player entities."

In an online game, the instance of the video game 110 may be persistent. That is, the video game 110 may continue on whether or not individual users are currently logged in or participating in the video game 110. A user that logs out of the video game 110 and then logs back in some time later may find the virtual environment or the video game 110 has been changed through the interactions of other users with the video game 110 during the time the user was logged out. These changes may include changes to the simulated physical space, changes in the user's inventory, changes in other users' inventories, changes experienced by non-user characters, or other changes.

Interactive Computing System

The interactive computing system 130 may include an application host system 132 and a data store 134. The interactive computing system 130 may include one or more computing systems configured to execute a portion of the game application 110. The interactive computing system 130 may enable multiple users or computing systems to access a portion of the game application 110 executed or hosted by the interactive computing system 130. The interactive computing system 130 can have one or more game servers that are configured to host online video games. For example, the interactive computing system 130 may have one or more game servers that are configured to host an instance (e.g., a first person shooter multiplayer match) or a persistent virtual environment (e.g., a multiplayer online roll playing game). The virtual environment may enable one or more users to interact with the environment and with each other in a synchronous or asynchronous manner. In some cases, multiple instances of the persistent virtual environment may be created or hosted by one or more game servers. A set of users may be assigned to or may access one instance of the virtual environment while another set of users may be assigned to or may access another instance of the virtual environment. In some embodiments, the interactive computing system 130 may execute a hosting system for executing various aspects of a game environment. For example, in one embodiment, the game application 110 may be a competitive game, such as a first person shooter or sports game, and the interactive computing system 130 can provide a dedicated hosting service (such as, through the game servers) for hosting multiplayer game instances or facilitate the creation of game instances hosted by user computing devices.

Animation Generation System

The animation generation system 150 generates realistic poses based on user-selected modifications to the poses. For example, as described herein, the user of the game application can select a character pose to modify. The character pose may be associated with a particular frame of a plurality of frame of an animation. The user can also select a modification to the character pose, such as a change to at least one position, angle, or velocity associated with an arrangement of the rigid bodies and joints of the in-game character. The animation generation system 150 generates a modified version of the selected pose that realistically implements the proposed modification by the user. The animation generation system 150 can also update the other poses associated with the animation to implement the proposed modification. In this way, the user can realistically extrapolate the modification across some or all of the poses associated with the animation, thereby realistically implementing the modification throughout the animation. Furthermore, in some cases, the animation generation system 150 can update the other animations to implement the proposed modification. In this way, the user can make a modification to one animation (e.g., running), and that modification can be realistically implemented across some or all other animations (e.g., walking).

The animation generation system 150 can provide a deep learning framework to produce a large variety of character motions in a controllable manner from unstructured motion capture data. The animation generation system 150 can imitate animation layering using neural networks with the aim to overcome the typical challenges when mixing, blending and editing movements from unaligned motion sources. The animation generation system 150 can synthesize novel movements from given reference motions and simple user controls (e.g., indicating modifications to the reference motions), and generate unique versions of locomotion or asynchronous motions. For achieving this task, the animation generation system 150 can adopt a modular framework that is composed of a motion generator, that maps the trajectories of a number of key joints and root trajectory to the full body motion, and a set of different control modules that map the user inputs to such trajectories. The motion generator functions as a motion manifold that not only projects novel mixed/edited trajectories to natural full-body motion, but also synthesizes realistic transitions between different motions. The control modules can be task dependent and can be developed and trained separately by engineers to include novel motion tasks, which greatly reduces network iteration time when working with large-scale datasets.

Additional description and examples of the animation generation system and/or the deep learning framework can be found in in U.S. patent application Ser. No. 17/305,214

("the '214 application"), filed Jul. 1, 2021, entitled "NEURAL ANIMATION LAYERING FOR SYNTHESIZING MARTIAL ARTS MOVEMENTS," the disclosure of which is hereby incorporated herein by reference in its entirety for all purposes. Some or all of the concepts described in this application are compatible with and can be used in conjunction with any combination of the embodiments and/or features described in the '214 application.

Animation Generation System

Figure 2A:
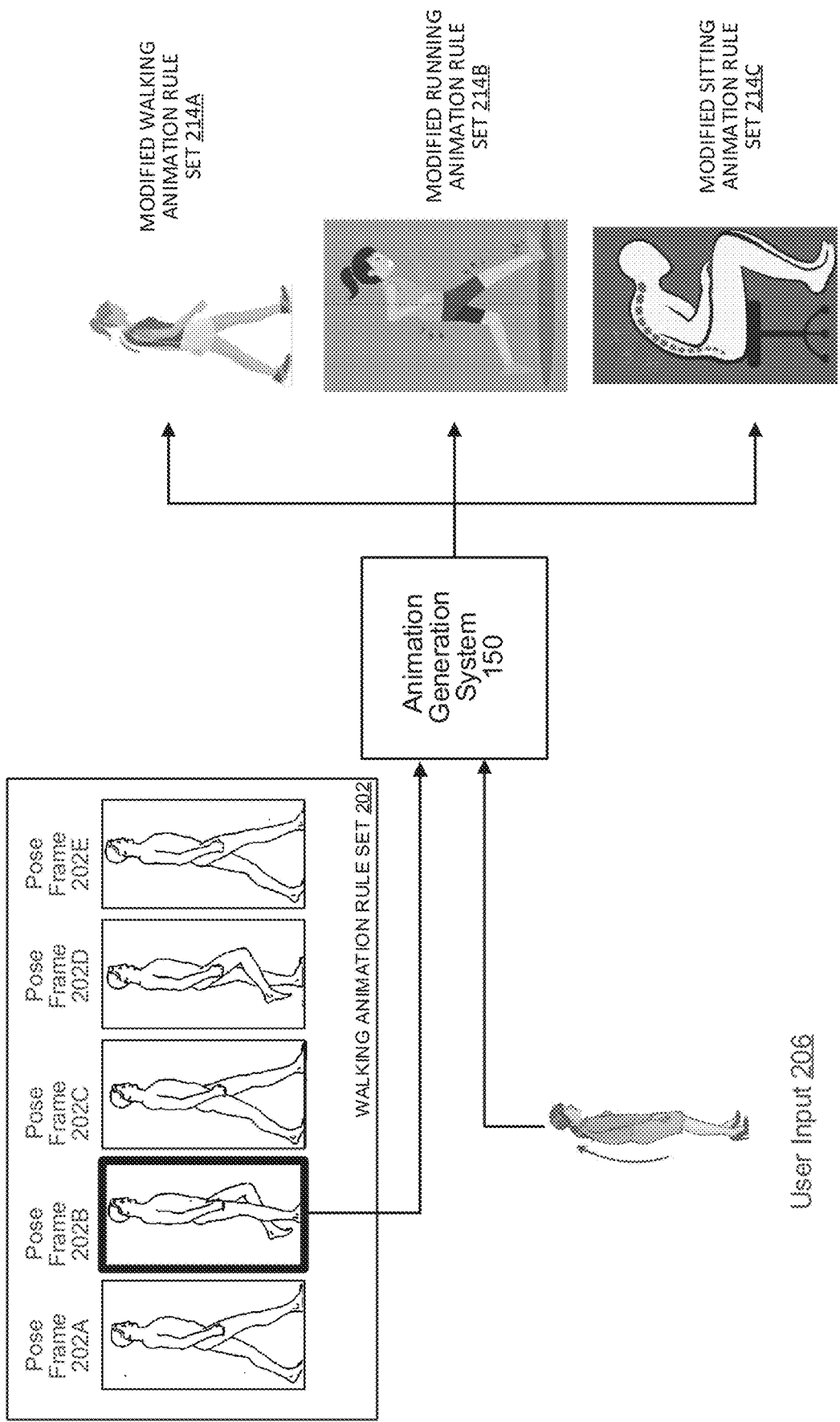
FIG. 2A is a block diagram of an example animation generation system for updating poses of one or more types of animation.

FIG. 2A is a block diagram of an example animation generation system 150 that modifies an animation rules set associated with an animation (e.g., running, walking, and sitting) based on a user an instruction to modify one or more character poses associated with that animation. The animation generation system 150 may represent a system of one or more computers, one or more virtual machines executing on a system of one or more computers, and so on. In some embodiments, the animation generation system 150 may represent an application, or other software, which is executed by an electronic game system. Thus, the functionality described herein may be implemented by an electronic game system during gameplay of an electronic game. As will be described, the animation generation system 150 may implement a pose generation engine 220 to output updates to poses of various types of animation based on one or more modifications to a pose.

In the illustrated example, the walking animation rule set 202 defines a series of distinct character poses 202A, 202B, 202C, 202D, 202E (individually or collectively referred to as pose 202 or poses 202) relating to a walking motion. The character pose 202B may therefore represent a specific pose used as part of the walking motion. Furthermore, as shown, each of the walking poses depict a character having a relatively upright posture. As may be appreciated, the number of distinct poses for a particular motion may vary across embodiments.

The animation generation system 150 can generate (or update) poses of a particular type of animation (e.g., walking) based on the character pose 202B and/or the user input 206, which indicates a modification to the character pose 202B. In particular, in this example, the user input 206 indicates an instruction to modify a posture associated with the character pose 202B such that the in-game character is hunched forward. As such, the animation generation system 150 can generate the modified walking rule set 214A, such that some or all of the walking poses 202 (202A, 202B, 202C, 202D, 202E) are updated by the animation generation system 150 to form the modified walking rule set 214A. Accordingly, in some cases, in response to receiving input to modify the character pose 202B, the animation generation system 150 can modify the some or all of the other character poses associated with the walking rule set 202.

Further, the animation generation system 150 can generate (or update) poses of a different types of animation (e.g., running, sitting) based on the user input 206 indicating to modify the character pose 202B. Continuing with the above example, the animation generation system 150 can generate the modified running rule set 214B and the modified sitting rule set 214C such that the running and sitting motions include the posture modification added to the pose 202B of the walking poses 202. Accordingly, in some cases, in response to receiving input to modify one or more poses of a first type of animation (in this example, a walking animation), the animation generation system 150 can modify some or all of the poses associated with other types of animation (in this example, running and sitting animations). In this way, the modification to the posture in the walking pose 202B can be characterized as a global change to the posture of some or all motions for the character.

Figure 2B:
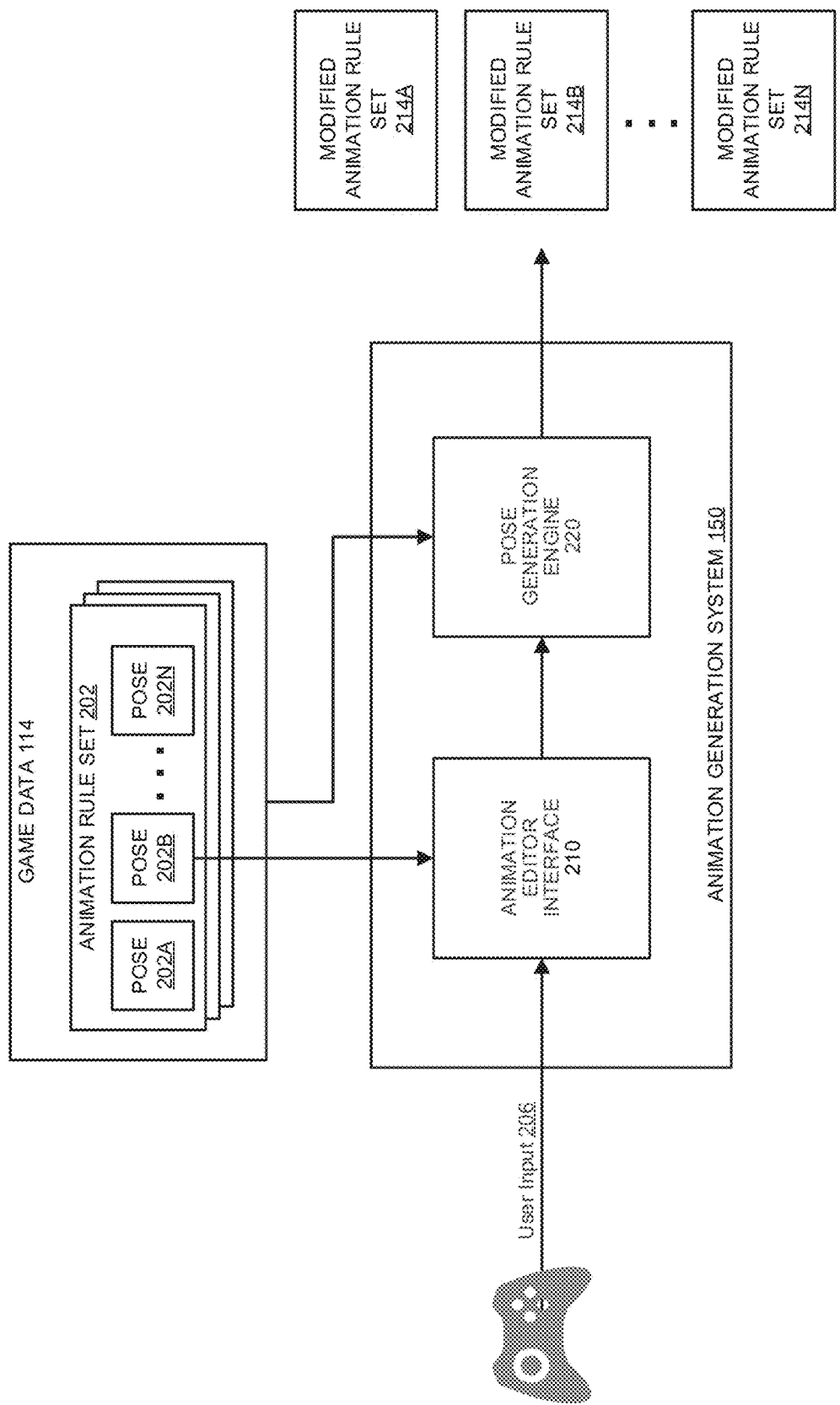
FIG. 2B is a block diagram illustrating detail of the animation generation system 150.

FIG. 2B is a block diagram illustrating detail of the animation generation system 150. In this illustrated example, the animation generation system 150 includes example animation editor interface 210 and pose generation engine 220, which are individually or collectively usable to dynamically generate animation.

Customizing In-Game Character Animations

An animation generation system enables a user of the video game to create custom animations (e.g., a repeating 3-second animation for an avatar), modify existing animations (e.g., running motions, walking motions), or assign particular pose parameters (e.g., posture characteristics, gait parameters) to a virtual avatar to modify some or all of the animations for that avatar. For example, during runtime of the video game, the user of the video game can interact with an animation-editing interface to select content (e.g., particular animations, particular poses, particular frames, etc.) for modification and/or select desired modifications. The animation generation system uses a deep learning framework to realistically extrapolate these edits into edits across portions (or the entire) animation. In this way, users of the video game can easily create and apply unique modifications to animations, to create customized animations that realistically (e.g., avoiding transitions or movements that violate physics or place the in-game characters in an unnatural configurations) integrate the user's edits.

In some cases, a modification to a single pose (or a few poses) can be realistically extrapolated to other poses. Consider a scenario in which an animation for walking includes a series of ten distinct poses, where each pose represents a snapshot of the walking animation. In such a scenario, the user may interact with an animation-editing interface to modify the walking animation. As an example, the user may interact with the animation-editing interface to select a third pose from the series of ten distinct poses, and the animation-editing interface may provide the user with several modifications options for modifying the third pose. Upon a select of one or more modification options, the animation generation system can apply selected modifications to a motion generation machine learning model to determine a realistic modification to the third pose. In addition, the animation generation system can use the motion generation machine learning model to extrapolate modifications to the other nine poses of the walking animation. In this way, the animation generation system can modify the entire walking animation based on modifications to the third pose.

In some cases, a modification to one type of animation (e.g., walking) can be realistically extrapolated to other types of animation (e.g., running). For example, returning to the scenario above, the animation generation system determines an updating walking animation based on selections by the user. In addition, in some cases, the animation generation system can use the motion generation machine learning model to extrapolate modifications to the running animation as well. For example, if the modification were the introduction of a limp associated with the avatar's right leg, then the animation generation system can update the walking animation to include the limb, and can also update the running animation (or another animation) to include the limb.

Accordingly, in some cases, an attribute (in this case, a limp) can be globally applied to some or all animations associated with a particular avatar.

Figure 3:
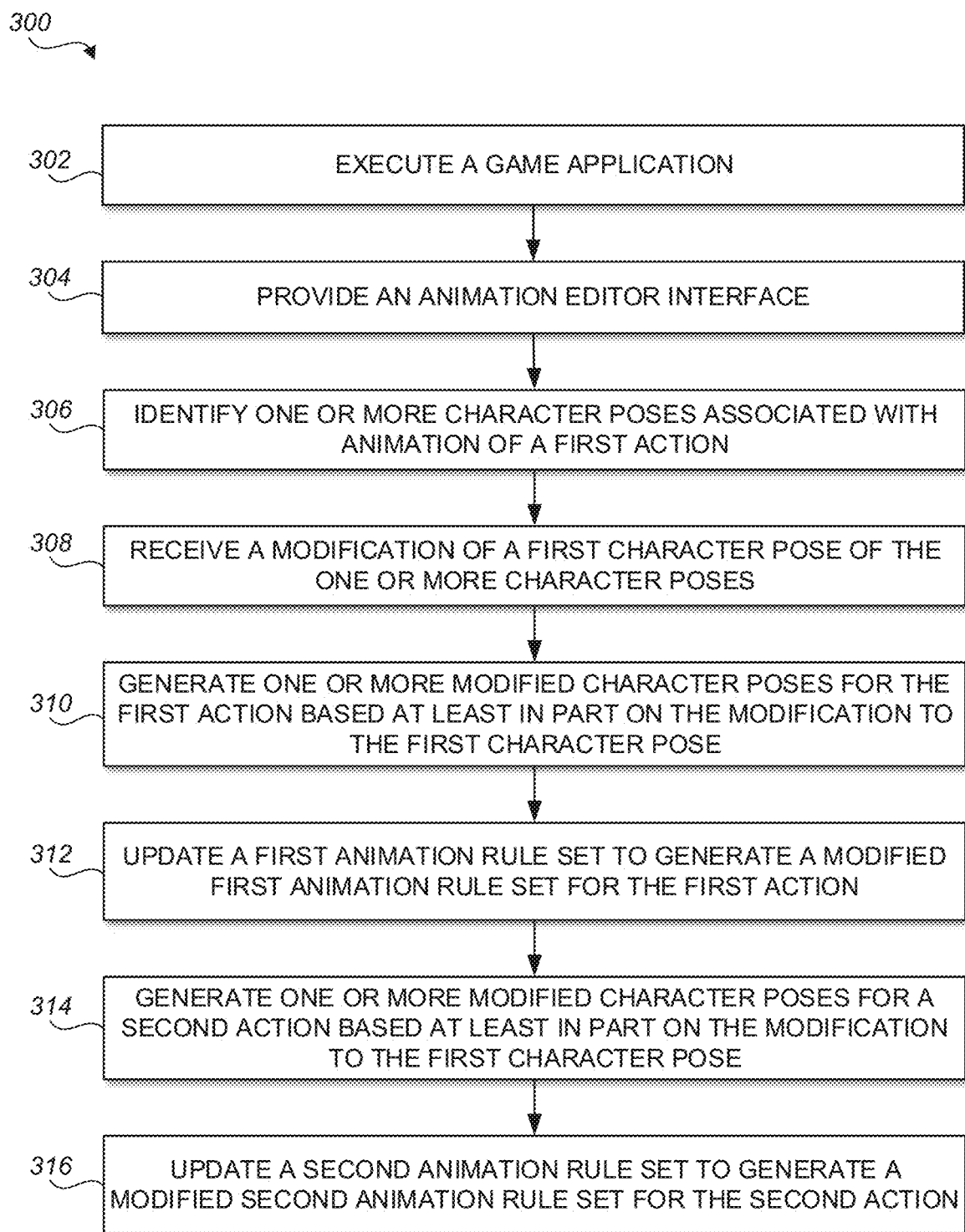
FIG. 3 presents a flowchart of an embodiment of a process for customizing in-game character animations during runtime of the game application.

FIG. 3 presents a flowchart of an embodiment of a process 300 for customizing in-game character animations during runtime of the game application 110. The process 300, in whole or in part, can be implemented by, for example, an interactive computing system 130 or a user computing system 102, among others. Although any number of systems, in whole or in part, can implement the process 300, to simplify discussion, the process 300 will be described with respect to the user computing system 102. Further, it should be understood that the process 300 may be performed repeatedly over time. For example, the process 300 may be repeated each time a user of the game application 110 provides instructions to modify the pose of one or more in-game characters.

At block 302, the user computing system 102 executes a game application 110 to provide a game for a user to play. As described herein, the game application 110 may be stored and/or executed locally on the user computing system 102 and/or in a distributed environment. During runtime of the game application 110, the user computing system 102 executes the game logic, controls execution of the simulation of gameplay, and controls rendering within the game application 110.

During runtime of the game application 110, the user computing system 102 can apply various animation rule sets 114. An animation rule set 114 defines the specific way in which players behave or interact within the game application 110. For example, an animation rule set 114 can include a series of character poses defining animation of a particular action of an in-game character within the game application. As mentioned, an in-game character can include a plurality of rigid bodies (e.g., bones) connected by a plurality of joints. Accordingly, in some cases, an animation rule set 114 can include a series of distinct poses (or frames) of an in-game character, where each pose is a particular arrangement of the rigid bodies and joints of the in-game character. In some cases, the game data 114 can store one or more different animation rule set 114 for each action (e.g., walking, running, jumping, hopping, crawling, marching, climbing, galloping, sliding, leaping, hopping, skipping, standing up, sitting down, punching, kicking, swing a sword, bending, etc.). In some such cases, the rule set manager 120 can interface with the game engine 112 to cause the game engine 112 to apply the appropriate animation rule set 114.

At block 304, the user computing system 102 provides an animation editor interface. As described herein, for example with respect to any of FIGS. 4A-4C, the animation editor interface can include an interface for the user to select and/or make modifications to one or more character poses defining animation of actions that depict an in-game character within the game application 110. The animation editor interface can include simple user controls (e.g., drag and drop features, selectable options, sliders, etc.) for intuitive use by individuals with no animation background. In some cases, using the animation editor interface, the user can select (e.g., via a user input device 140) a particular pose and/or action for modification and/or can select or input a particular modification to make.

At block 306, the user computing system 102 identifies one or more character poses associated with animation of a first action. In some cases, the user computing system 102 identifies a plurality of character poses. For example, the user computing system 102 may identify two, three, or more character poses associated the animation of the first action. In addition or alternatively, the user computing system 102 can identify the first action.

As described herein, an action (sometimes referred to as an animation) is comprised of a series of character poses (and associated frames) that collectively form the action. For example, the game application 100 may interpolate between these poses/frames such that an in-game character appears to transition between them, thereby causing the appearance of the in-game character performing the action. For purposes of this example, the one or more character poses are a subset of a first series of character poses associated with the first action. Furthermore, for purposes of this example, the animation rule set that includes the first series of character poses is referred to as the first animation rule set.

The first action may be characterized by an animation type. For example, in instances in which the first action corresponds to a form of locomotion, the first action can include, but is not limited to, any one or any combination of the following animation types: walking, running, jumping, hopping, crawling, marching, climbing, galloping, sliding, leaping, hopping, skipping. As another example, in instances in which the first action corresponds to a form of asynchronous motion, the first action can include, but is not limited to, any one or any combination of the following animation types: standing up, sitting down, punching, kicking, swinging an object, or bending.

In some cases, to identify the one or more character poses (and/or the first action), the user computing system 102 can receive the one or more character poses as a result of user input into the user computing system 102. For example, as described herein, the user may interface with an animation editor interface to select or identify the one or more character poses.

At block 308, the user computing system 102 identifies a modification for a first character pose of the one or more character poses. The modification can corresponding to a change in value of one or more pose parameters. For example, as described herein, a character pose can be characterized by a plurality of pose parameters. The pose parameters can vary across embodiments. For example, in some cases, the pose parameters can include values indicative of the gait of the in-game character. For example, the pose parameters can include values indicative of, but not limited to, step length, stride length, step width, or foot angle. As another example, in some cases, pose parameters can include values relating to the posture or flexibility of the in-game character. For example, the pose parameters can include values relating to, but not limited to, a limp, a back bend angle (e.g., a back arch, a slouch), a sideways lean (e.g., left or right), a neck bend angle/direction, a character height, a knee bend angle, character flexibility, or shoulder width/level. As another example, in some cases, pose parameters can include values relating to the other characteristics of the in-game character. For example, the pose parameters can include values relating to, but not limited to, an angle of a movement (e.g., angle of swinging sword), a general laziness, a general energy level, etc.

In some cases, the modification can include a movement rigid bodies (e.g., bones) or joints of the in-game character. For example, the user may interact with the animation editor interface to reposition or rotate one or more of the bones or joints of the in-game character. In some cases, the user may reposition or rotate of limb (e.g., arm, leg) or other body portion (e.g., head, trunk) and the corresponding bones or joints will move as well, for example based on realistic movements of the in-game character.

In some cases, to identify the modification, the user computing system 102 can receive the modification responsive to user input into the user computing system 102. For example, as described herein, the user may interface with an animation editor interface to select or identify the modification.

At block 310, the user computing system 102 generates one or more modified character poses for the first action based at least in part on the modification to the first character pose. The one or more modified character poses can collectively depict the in-game character performing the first action, with the modification (sometimes referred to as the modified first action). Consider an example in which the first action is walking, and the modification modifies the in-game character to cause the in-game character to slouch forward. In such an example, the one or more modified character poses can collectively depict the in-game character walking with a forward slouch, in a realistic manner. Accordingly, the user computing system 102 can generate realistic updates to the one or more character poses based on the modification to the first character pose.

The user computing system 102 can generate the one or more modified character poses using any of a variety of techniques. For example, as described herein, the user computing system 102 may determine positions, orientations, and so on, of a skeleton or rig which underlies the illustrated in-game character. Based on the modification, the series of poses may be updated or generated to realistically conform to positions, orientations to the modifications. In some cases, the user computing system 102 applies the one or more character poses and the modification to a motion generation machine learning model to obtain the one or more modified character poses. For example, the motion generation machine learning model can determine or predict the impact of the modification on the first character pose the character by applying the modification to a deep learning model, and the motion generation machine learning model can extrapolate the modification to the series of first character poses. In some embodiments, the user computing system 102 can generate one or more modified character poses by utilizing a deep learning framework. For example, the user computing system 102 (e.g., the animation generation system 150) can imitate animation layering using neural networks with the aim to overcome the typical challenges when mixing, blending and editing movements from unaligned motion sources.

At block 312, the user computing system 102 updates the first animation rule set to generate a modified first animation rule set for the first action. In some cases, to generate the modified first animation rule set from the (unmodified) first animation rule set, the user computing system 102 replaces the corresponding one or more (unmodified) character poses for the first action with the one or more modified character poses for the first action. As described herein, an animation rule set can be associated with an action, the series of poses for that action, and/or the frames associated with that action. In some such cases, the modified first animation rule set is associated with the modified first action or the series of modified poses for the modified first action. In some cases, the user computing system 102 performs post-processing on the one or more modified character poses to resolve motion artifacts.

At block 314, the user computing system 102 generates one or more modified character poses for a second action based at least in part on the modification to the first character pose. For purposes of this example, the second action is associated with a second animation rule set. As described herein, the series of first character poses can correspond to a first action (e.g., running). Furthermore, tor this example, the series of second character poses can correspond to a second action (e.g., walking). Accordingly, using similar techniques to that described with respect to block 310, the system can determine a modified series of second character poses based on the series of second character poses and the identified modification to the first character pose.

Consider an example in which the first action is running, the second action is walking, and the modification modifies the in-game character to cause the in-game character to slouch forward. In such an example, at block 314, the modified series of second character poses can collectively depict the in-game character running with a forward slouch, in a realistic manner. Accordingly, the user computing system 102 can generate realistic updates to the modified series of second character poses based on the modification to the first character pose.

At block 316, similar to block 312, the user computing system 102 updates the second animation rule set to generate a modified second animation rule set for the second action. In some cases, to generate the modified second animation rule set from the (unmodified) second animation rule set, the user computing system 102 replaces the corresponding one or more (unmodified) character poses for the second action with the one or more modified character poses for the second action.

It will be understood that the various blocks described herein can be implemented in a variety of orders, and that the user computing system 102 can implement one or more of the blocks concurrently or change the order, as desired. For example, the user computing system 102 can concurrently apply the character poses of the first and second actions to the motion generation machine learning model. Furthermore, the user computing system 102 can concurrently receive or identify the selected character pose and the modification to the selected character pose.

Furthermore, it will be understood that fewer, more, or different blocks can be used as part of the process 300. For example, in some cases, the user computing system 102 applies the modified animation rule set to the game application based at least in part on a determination that the runtime state of the game application is the first runtime state. For example, the user computing system 102 can determine that one or more triggering conditions are met, which indicate, for example to the rule set manager, that the modified animation rule set should be applied. Responsive to identifying the occurrence of a first triggering game state, the user computing system 102 can apply the modified animation rule set during the runtime of the game application to cause the in-game character to perform the modified action. In some embodiments, the blocks of process 300 can each occur during runtime of the game application. In some embodiments, one or more of the blocks of process 300 can each occur while the game application is not running.

Animation Editor Interface

Figure 4A:
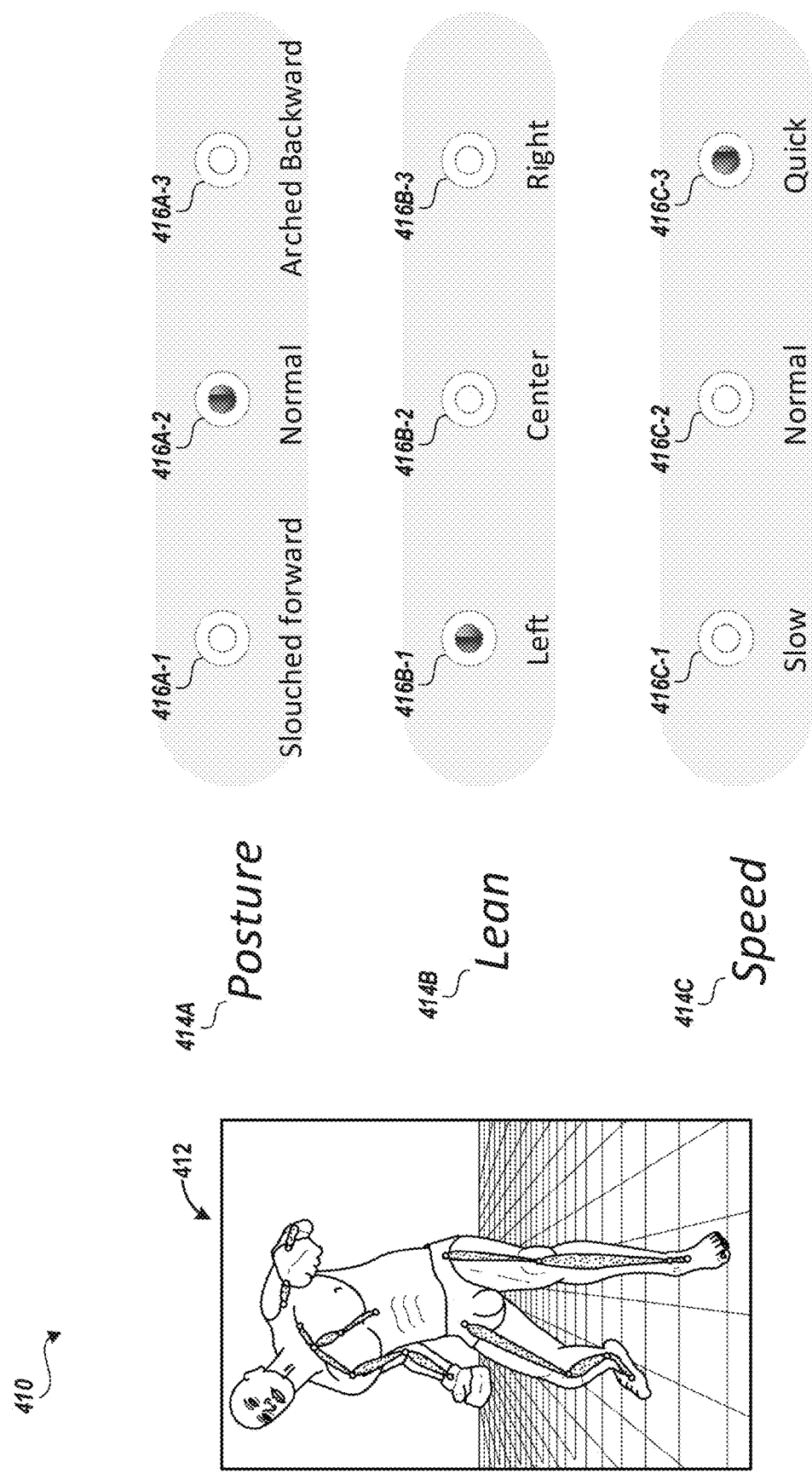
FIGS. 4A-4C illustrate example embodiments of animation editor interfaces.
Figure 4B:
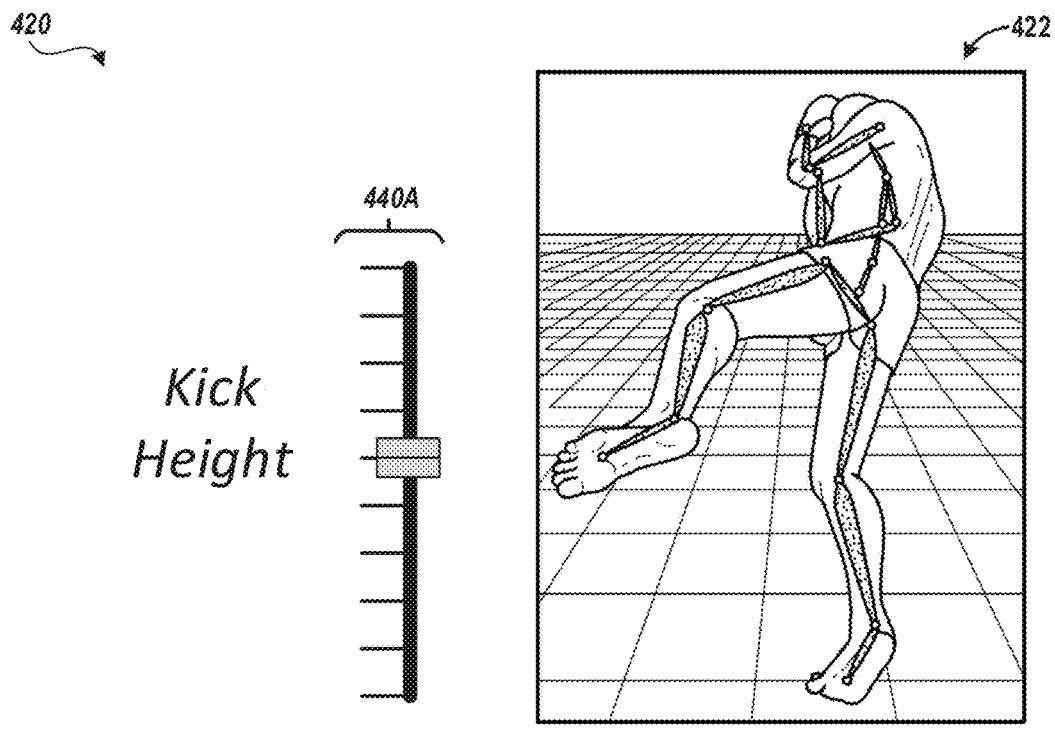
Figure 4C:
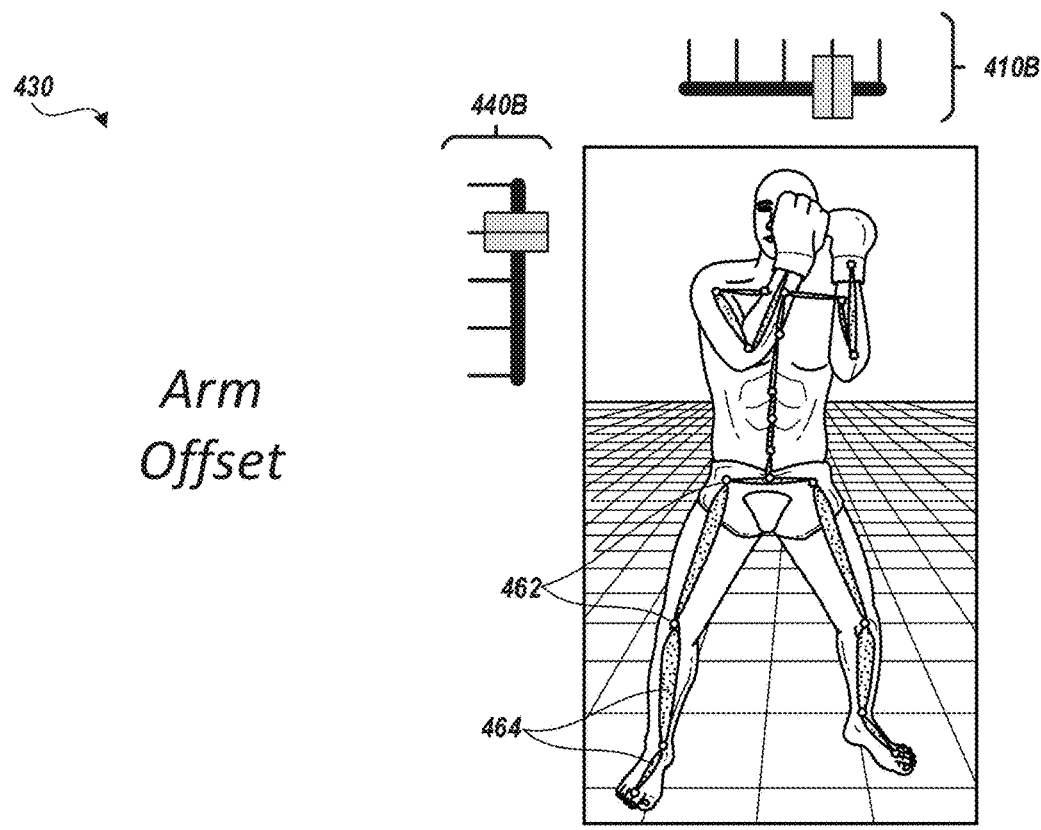

FIGS. 4A-4C illustrate example embodiments of animation editor interfaces 410, 420, 430. As described herein, during runtime of the game application 110, the game application 110 can provide an animation-editing interface that allows users of the game application 110 to introduce modifications to character animations and/or create new character animations. Advantageously, an animation editor interface can implement intuitive user controls that may be simple enough to be used by players with no animation background. For example, the animation generation system 150 can provide a transparent control interface for users of the video game and allow modifying poses.

FIG. 4A illustrates an example animation editor interface 410. In this example, the animation editor interface 410 includes a representation 412 of a motion that is to be modified or created. The representation 412 may be a particular pose or frame associated with a type of animation. In addition or alternatively, the representation 412 may include a video clip (e.g., a recurring video clip) that transitions through a series of poses. In the example of FIG. 4A, the animation editor interface 410 allows modification of three different pose parameters: Posture 414A, Lean 414B, and Speed 414C (individually or collectively referred to as pose parameter 414 or pose parameters 414).

The animation editor interface 410 presents three different options for each pose parameter 414. In particular, for the "Posture" 416A pose parameter, the animation editor interface presents the options: slouched forward 416A-1, normal 416A-2, and arched backward (416A-3) (individually or collectively referred to as option 416A or options 416A). Furthermore, for the "Lean" 416B pose parameter, the animation editor interface presents the options: left 416B-1, center 416B-2, and right (416B-3) (individually or collectively referred to as option 416B or options 416B). Furthermore, for the "Speed" 416C pose parameter, the animation editor interface presents the options: slow 416C-1, normal 416C-2, and quick (416C-3) (individually or collectively referred to as option 416C or options 416C).

In some cases, in response to a selection of one or more of the options 416A, 416B, 416C, the animation editor interface 410 can update the representation 412 to display a representation of the selected options. For example, in this example, the normal posture, left lean, and quick speed options are selected, and the representation 412 illustrates an in-game character having a particular arrangement of bones and joints that correspond to those selected options. As described herein, the game application 110 can create a realistic interpolation of the full-body pose according to the selected options and/or modifications by the user of the game application.

FIGS. 4B and 4C illustrate other example animation editor interfaces 420, 430. In these examples, the animation editor interfaces 420, 430 include representations 422, 432 of a motion that is to be modified or created by the user of the video game 110. As shown, the animation editor interfaces 420, 430 include sliding scales 440A, 440B, 440C that allow adjustment of various pose parameters. In particular, the sliding scale 440A includes a moveable member that allows the user to adjust the kick height (e.g., the height of the in-game character's foot for a kicking motion); the sliding scale 440B includes a moveable member that allows the user to adjust an arm height in a protection stance; and the sliding scale 440C includes a moveable member that allows the user to adjust the arm offset (e.g., how far left or right) in the protection stance.

It will be understood that an animation editor interface can provide any number of pose parameters options, and further understood that the pose parameter options may be presented or selected using any number of techniques. For example, in some cases, an animation editor interface can provide a drag and drop interface that changes based on user selected options.

As another example, in some cases, the user may be able to interactively move (e.g., reposition, rotate, etc.) one or more body parts to denote the modification. For example, as described herein, an in-game character can include a plurality of rigid bodies 464 (e.g., bones) connected by a plurality of joints 462. In some such cases, the animation editor interface 430 may allow the user to select the modification by repositioning or rotating one or more of the bones 464 or joints 462 of the in-game character. In addition or alternately, in some cases, rather than select a particular bone or joint, the user may be able to reposition or rotate of limb (e.g., arm, leg) or other body portion (e.g., head, trunk), and the corresponding bones or joints will automatically move as well, for example based on realistic movements of the in-game character.

Overview of Computing System

Figure 5:
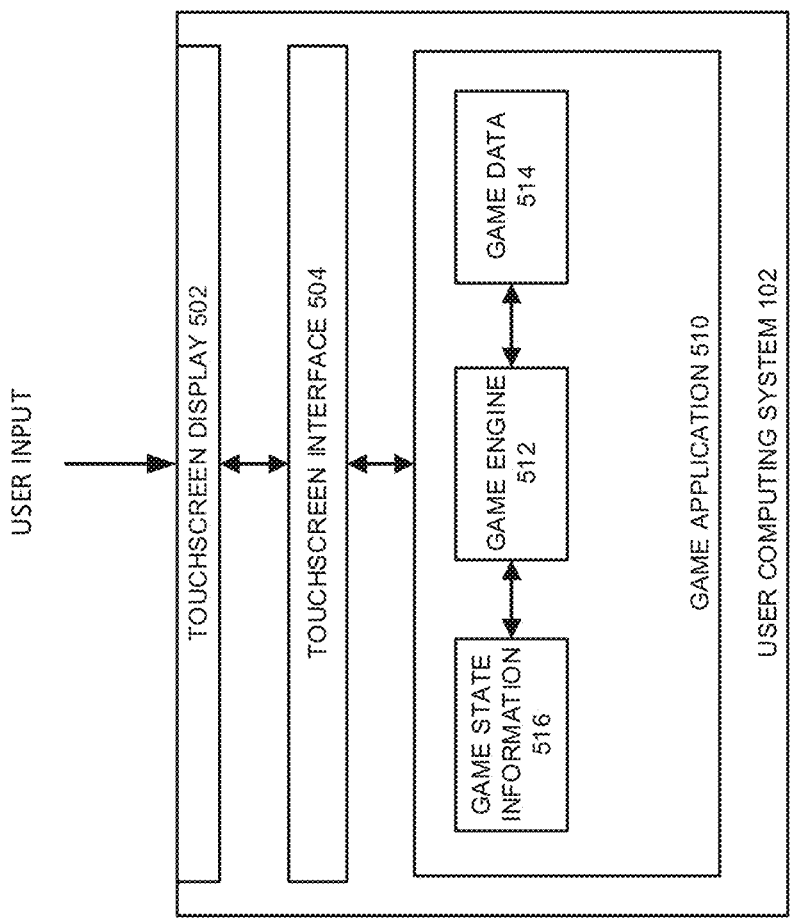
FIG. 5 illustrates an embodiment of a user computing system.

FIG. 5 illustrates an embodiment of a user computing system 102, which may also be referred to as a gaming system. As illustrated, the user computing system 102 may be a single computing device that can include a number of elements. However, in some cases, the user computing system 102 may include multiple devices. For example, the user computing system 102 may include one device that includes that includes a central processing unit and a graphics processing unit, another device that includes a display, and another device that includes an input mechanism, such as a keyboard or mouse.

The user computing system 102 can be an embodiment of a computing system that can execute a game system. In the non-limiting example of FIG. 6, the user computing system 102 is a touch-capable computing device capable of receiving input from a user via a touchscreen display 502. However, the user computing system 102 is not limited as such and may include non-touch capable embodiments, which do not include a touchscreen display 502.

The user computing system 102 includes a touchscreen display 502 and a touchscreen interface 504, and is configured to execute a game application 510. This game application may be the game application 110 or an application that executes in conjunction with or in support of the game application 110, such as a video game 110 execution environment. Although described as a game application 510, in some embodiments the application 510 may be another type of application that may have a variable execution state based at least in part on the preferences or capabilities of a user, such as educational software. While user computing system 102 includes the touchscreen display 502, it is recognized that a variety of input devices may be used in addition to or in place of the touchscreen display 502.

The user computing system 102 can include one or more processors, such as central processing units (CPUs), graphics processing units (GPUs), and accelerated processing units (APUs). Further, the user computing system 102 may include one or more data storage elements. In some embodiments, the user computing system 102 can be a specialized computing device created for the purpose of executing game applications 510. For example, the user computing system 102 may be a video game 110 console. The game applications 510 executed by the user computing system 102 may be created using a particular application programming interface (API) or compiled into a particular instruction set that may be specific to the user computing system 102. In some embodiments, the user computing system 102 may be a general purpose computing device capable of executing game applications 510 and non-game applications. For example, the user computing system 102 may be a laptop with an integrated touchscreen display or desktop computer with an external touchscreen display. Components of an example embodiment of a user computing system 102 are described in more detail with respect to FIG. 6.

The touchscreen display 502 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 502. The touchscreen interface 504 can be configured to translate the touch input into data and output the data such that it can be interpreted by components of the user computing system 102, such as an operating system and the game application 510. The touchscreen interface 504 can translate characteristics of the tactile touch input touch into touch input data. Some example characteristics of a touch input can include, shape, size, pressure, location, direction, momentum, duration, or other characteristics. The touchscreen interface 504 can be configured to determine the type of touch input, such as, for example a tap (e.g., touch and release at a single location) or a swipe (e.g., movement through a plurality of locations on touchscreen in a single touch input). The touchscreen interface 504 can be configured to detect and output touch input data associated with multiple touch inputs occurring simultaneously or substantially in parallel. In some cases, the simultaneous touch inputs may include instances where a user maintains a first touch on the touchscreen display 502 while subsequently performing a second touch on the touchscreen display 502. The touchscreen interface 504 can be configured to detect movement of the touch inputs. The touch input data can be transmitted to components of the user computing system 102 for processing. For example, the touch input data can be transmitted directly to the game application 510 for processing.

In some embodiments, the touch input data can undergo processing or filtering by the touchscreen interface 504, an operating system, or other components prior to being output to the game application 510. As one example, raw touch input data can be captured from a touch input. The raw data can be filtered to remove background noise, pressure values associated with the input can be measured, and location coordinates associated with the touch input can be calculated. The type of touch input data provided to the game application 510 can be dependent upon the specific implementation of the touchscreen interface 504 and the particular API associated with the touchscreen interface 504. In some embodiments, the touch input data can include location coordinates of the touch input. The touch signal data can be output at a defined frequency. Processing the touch inputs can be computed many times per second and the touch input data can be output to the game application for further processing.

A game application 510 can be configured to be executed on the user computing system 102. The game application 510 may also be referred to as a video game 110, a game, game code or a game program. A game application should be understood to include software code that a user computing system 102 can use to provide a game for a user to play. A game application 510 might include software code that informs a user computing system 102 of processor instructions to execute, but might also include data used in the playing of the game, such as data relating to constants, images and other data structures. For example, in the illustrated embodiment, the game application includes a game engine 512, game data 514, and game state data 516.

The touchscreen interface 504 or another component of the user computing system 102, such as the operating system, can provide user input, such as touch inputs, to the game application 510. In some embodiments, the user computing system 102 may include alternative or additional user input devices, such as a mouse, a keyboard, a camera, a game controller, and the like. A user can interact with the game application 510 via the touchscreen interface 504 or one or more of the alternative or additional user input devices. The game engine 512 can be configured to execute aspects of the operation of the game application 510 within the user computing system 102. Execution of aspects of gameplay within a game application can be based, at least in part, on the user input received, the game data 514, and game state data 516. The game data 514 can include game rules, prerecorded motion capture poses/paths, environmental settings, constraints, animation reference curves, skeleton models, or other game application information. Further, the game data 514 may include information that is used to set or adjust the difficulty of the game application 510.

The game engine 512 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 510, the game application 510 can store game state data 516, which can include character states, environment states, scene object storage, or other information associated with a state of execution of the game application 510. For example, the game state data 516 can identify the state of the game application at a specific point in time, such as a character position, character action, game level attributes, and other information contributing to a state of the game application.

The game engine 512 can receive the user inputs and determine in-game events, such as actions, collisions, runs, throws, attacks and other events appropriate for the game application 510. During operation, the game engine 512 can read in game data 514 and game state data 516 in order to determine the appropriate in-game events. In one example, after the game engine 512 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration of Computing System

Figure 6:
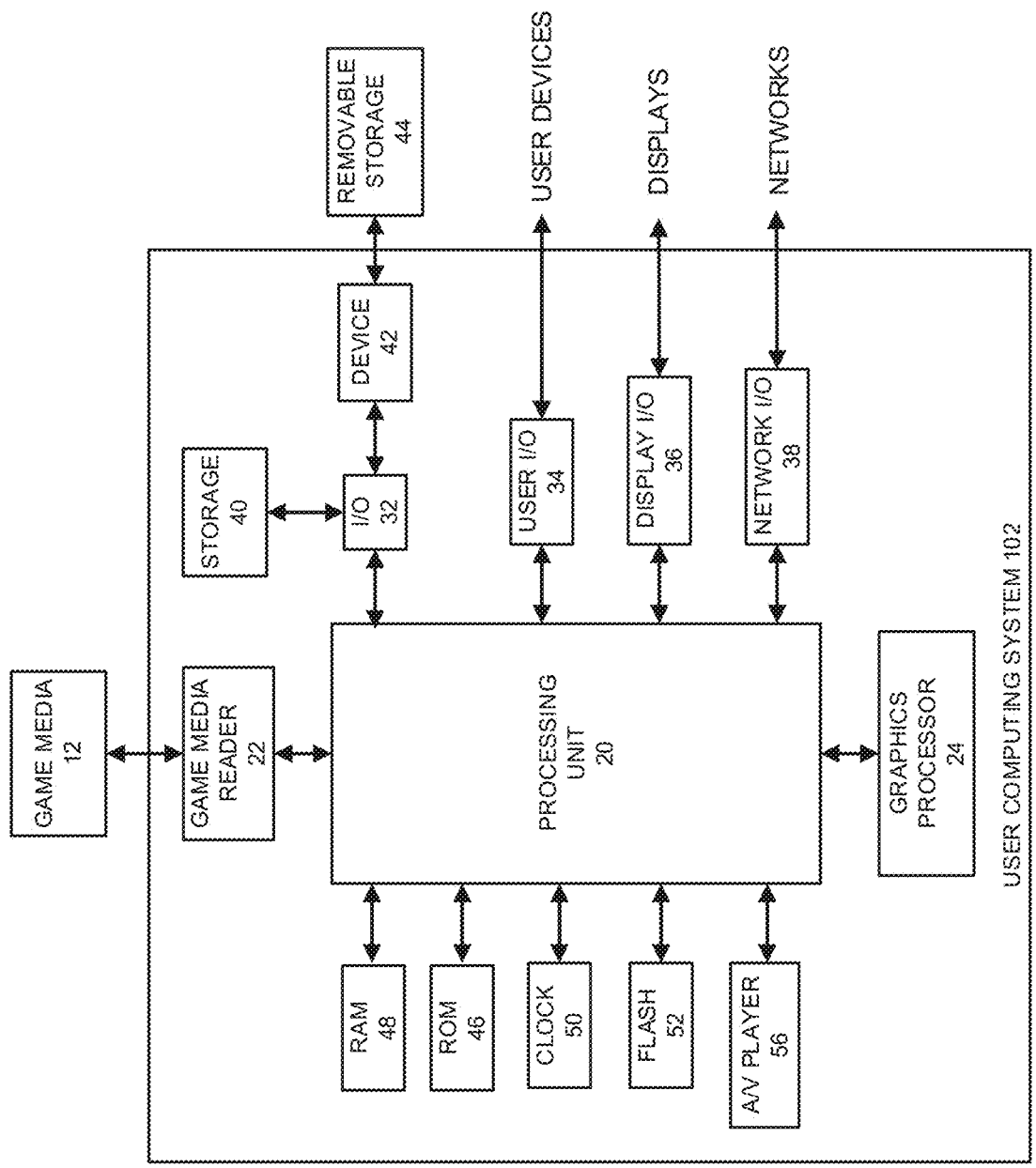
FIG. 6 illustrates an embodiment of a hardware configuration for the user computing system of FIG. 5.

FIG. 6 illustrates an embodiment of a hardware configuration for the user computing system 102 of FIG. 5. Other variations of the user computing system 102 may be substituted for the examples explicitly presented herein, such as removing or adding components to the user computing system 102. The user computing system 102 may include a dedicated game device, a smart phone, a tablet, a personal computer, a desktop, a laptop, a smart television, a car console display, and the like. Further, (although not explicitly illustrated in FIG. 6) as described with respect to FIG. 5, the user computing system 102 may optionally include a touchscreen display 502 and a touchscreen interface 504.

As shown, the user computing system 102 includes a processing unit 20 that interacts with other components of the user computing system 102 and also components external to the user computing system 102. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 28 rendering the game media reader 22 or the game media 12 optional.

The user computing system 102 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 102 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors or with an embedded or non-discrete graphics processing unit, which may be embedded into a motherboard and which is sometimes referred to as an on-board graphics chip or device.

The user computing system 102 also includes various components for enabling input/output, such as an I/O 22, a user I/O 24, a display I/O 26, and a network I/O 28. As previously described, the input/output components may, in some cases, including touch-enabled devices. The I/O 22 interacts with storage element 40 and, through a device 42, removable storage media 44 in order to provide storage for computing device 110. Processing unit 20 can communicate through I/O 22 to store data, such as game state data and any shared data files. In addition to storage 40 and removable storage media 44, computing device 110 is also shown including ROM (Read-Only Memory) 46 and RAM 48. RAM 48 may be used for data that is accessed frequently, such as when a game is being played.

User I/O 24 is used to send and receive commands between processing unit 20 and user devices, such as game controllers. In some embodiments, the user I/O 24 can include touchscreen inputs. As previously described, the touchscreen can be a capacitive touchscreen, a resistive touchscreen, or other type of touchscreen technology that is configured to receive user input through tactile inputs from the user. Display I/O 26 provides input/output functions that are used to display images from the game being played. Network I/O 28 is used for input/output functions for a network. Network I/O 28 may be used during execution of a game, such as when a game is being played online or being accessed online.

Display output signals may be produced by the display I/O 26 and can include signals for displaying visual content produced by the computing device 110 on a display device, such as graphics, user interfaces, video, or other visual content. The user computing system 102 may include one or more integrated displays configured to receive display output signals produced by the display I/O 26, which may be output for display to a user. According to some embodiments, display output signals produced by the display I/O 26 may also be output to one or more display devices external to the computing device 110.

The user computing system 102 can also include other features that may be used with a game, such as a clock 50, flash memory 52, and other components. An audio/video player 56 might also be used to play a video sequence, such as a movie. It should be understood that other components may be provided in the user computing system 102 and that a person skilled in the art will appreciate other variations of the user computing system 102.

Program code can be stored in ROM 46, RAM 48, or storage 40 (which might include hard disk, other magnetic storage, optical storage, solid state drives, or other non-volatile storage, or a combination or variation of these). At least part of the program code can be stored in ROM that is programmable (ROM, PROM, EPROM, EEPROM, and so forth), in storage 40, or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state or other data needed or usable for interpreting user input and generating game displays. Generally, RAM 48 is volatile storage and data stored within RAM 48 may be lost when the user computing system 102 is turned off or loses power.

As user computing system 102 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

Any process descriptions, elements or blocks in the flow diagrams described herein or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for customizing animation of an in-game character of a video game, the method comprising:

as implemented by one or more hardware processors of a computing system configured with specific computer-executable instructions, executing a game application on a client computing device, wherein the game application comprises game data, wherein the game data comprises an animation rule set including a series of character poses defining animation of a first action of an in-game character within the game application, wherein an in-game character comprises a plurality of rigid bodies connected by a plurality of joints, and wherein each character pose of the series of character poses is a particular arrangement of the rigid bodies and joints of the in-game character; and during runtime of the game application:

identifying one or more character poses associated with animation of the first action;

receiving, from a user of the game application, a modification to a first character pose of the one or more character poses, wherein the modification comprises a change to at least one position, angle, or velocity associated with the arrangement of the rigid bodies and joints of the in-game character;

generating one or more modified character poses for the first action based at least in part on the modification to the first character pose, wherein the one or more modified character poses for the first action are generated using a motion generation machine learning model; and updating the animation rule set to generate a modified animation rule set for the first action, wherein the one or more modified character poses for the first action replace the corresponding one or more unmodified character poses for the first action, wherein the modified animation rule set defining the modified one or more character poses generated by the character within a virtual environment of the game application when performing the first action.

2. The computer-implemented method of claim 1, wherein the animation rule set is a first animation rule set, wherein the series of character poses is a first series of character poses, wherein the game data further comprises a second animation rule set including a second series of character poses defining animation of a second action, wherein the method further comprises:
 generating one or more modified character poses for the second action based at least in part on the modification to the first character pose, wherein the one or more modified character poses for the second action are generated using a motion generation machine learning model; and
 updating a second animation rule set to generate a modified second animation rule set for the second action, wherein the one or more modified character poses for the second action replace corresponding one or more unmodified character poses for the second action.

3. The computer-implemented method of claim 2, wherein the first action is a first type of animation and the second action is a second type of animation that is different from the first type of animation.

4. The computer-implemented method of claim 3, wherein the first type of animation is one of a locomotion or an asynchronous motion, and wherein the second type of animation is the other one of the locomotion or the asynchronous motion.

5. The computer-implemented method of claim 4, wherein the locomotion comprises at least one of running, jumping, hopping, crawling, marching, climbing, galloping, sliding, leaping, hopping, or skipping.

6. The computer-implemented method of claim 4, wherein the asynchronous motion comprises at least one of standing up, sitting down, punching, kicking, swing a sword, or bending.

7. The computer-implemented method of claim 3, wherein the first type of animation is one of a first type of locomotion, and wherein the second type of animation is a second type of locomotion.

8. The computer-implemented method of claim 1, further comprising:
 post-processing the one or more modified character poses for the first action to resolve motion artifacts of the one or more modified character poses for the first action associated with the modification.

9. The computer-implemented method of claim 1, said identifying the one or more character poses associated with animation of the first action comprises receiving a selection from a user of the game application, wherein the selection indicates the one or more character poses associated with animation of the first action.

10. The computer-implemented method of claim 1, further comprising:
 monitoring gameplay of the game application during the runtime of the game application;
 identifying, during the monitoring, an occurrence of a first triggering game state during the runtime of the game application, the identifying being based on defined game conditions within the game application; and
 responsive to said identifying the occurrence of the first triggering game state, applying the modified animation rule set during the runtime of the game application causing the in-game character to perform the first action.

11. The computer-implemented method of claim 1, further comprising:
 providing an animation editor interface that provides an interface for the user to select the modification to the to the first character pose of the one or more character poses.

12. The computer-implemented method of claim 11, wherein the animation editor interface displays a plurality of possible modifications, wherein the modification comprises a set of the plurality of possible modifications.

13. A system comprising:
 an electronic data store configured to store computer-executable instructions associated with generating frames of an animation; and
 a hardware processor in communication with the electronic data store and configured to execute the computer-executable instructions to at least:
 execute a game application on a client computing device, wherein the game application comprises game data, wherein the game data comprises an animation rule set including a series of character poses defining animation of a first action of an in-game character within the game application, wherein an in-game character comprises a plurality of rigid bodies connected by a plurality of joints, and wherein each character pose of the series of character poses is a particular arrangement of the rigid bodies and joints of the in-game character; and
 during runtime of the game application:
 identify one or more character poses associated with animation of the first action;
 receive, from a user of the game application, a modification to a first character pose of the one or more character poses, wherein the modification comprises a change to at least one position, angle, or velocity associated with the arrangement of the rigid bodies and joints of the in-game character;
 generate one or more modified character poses for the first action based at least in part on the modification to the first character pose, wherein the one or more modified character poses for the first action are generated using a motion generation machine learning model; and
 update the animation rule set to generate a modified animation rule set for the first action, wherein the one or more modified character poses for the first action replace the corresponding one or more unmodified character poses for the first action, wherein the modified animation rule set defining the modified one or more of character poses generated by the character within a virtual environment of the game application when performing the first action.

14. The system claim 13, wherein the animation rule set is a first animation rule set, wherein the series of character poses is a first series of character poses, wherein the game data further comprises a second animation rule set including a second series of character poses defining animation of a second action, wherein the one or more processors are further configured to:
 generate one or more modified character poses for the second action based at least in part on the modification to the first character pose, wherein the one or more modified character poses for the second action are generated using a motion generation machine learning model; and
 update a second animation rule set to generate a modified second animation rule set for the second action, wherein the one or more modified character poses for the second action replace corresponding one or more unmodified character poses for the second action.

15. The system claim 14, wherein the first action is a first type of animation and the second action is a second type of animation that is different from the first type of animation.

16. The system claim 15, wherein the first type of animation is one of a locomotion or an asynchronous motion, and wherein the second type of animation is the other one of the locomotion or the asynchronous motion.

17. The system claim 16, wherein the locomotion comprises at least one of running, jumping, hopping, crawling, marching, climbing, galloping, sliding, leaping, hopping, or skipping.

18. The system claim 16, wherein the asynchronous motion comprises at least one of standing up, sitting down, punching, kicking, swing a sword, or bending.

19. The system claim 15, wherein the first type of animation is one of a first type of locomotion, and wherein the second type of animation is a second type of locomotion.

20. A non-transitory computer-readable storage medium storing computer-executable instructions that, when executed by one or more computing devices, configure the one or more computing devices to perform operations comprising:

executing a game application on a client computing device, wherein the game application comprises game data, wherein the game data comprises an animation rule set including a series of character poses defining animation of a first action of an in-game character within the game application, wherein an in-game character comprises a plurality of rigid bodies connected by a plurality of joints, and wherein each character pose of the series of character poses is a particular arrangement of the rigid bodies and joints of the in-game character; and during runtime of the game application:

identifying one or more character poses associated with animation of the first action;

receiving, from a user of the game application, a modification to a first character pose of the one or more character poses, wherein the modification comprises a change to at least one position, angle, or velocity associated with the arrangement of the rigid bodies and joints of the in-game character;

generating one or more modified character poses for the first action based at least in part on the modification to the first character pose, wherein the one or more modified character poses for the first action are generated using a motion generation machine learning model; and updating the animation rule set to generate a modified animation rule set for the first action, wherein the one or more modified character poses for the first action replace the corresponding one or more unmodified character poses for the first action, wherein the modified animation rule set defining the modified one or more of character poses generated by the character within a virtual environment of the game application when performing the first action.

* * * * *